(12) United States Patent
Matsen et al.

(10) Patent No.: US 9,277,594 B2
(45) Date of Patent: Mar. 1, 2016

(54) INDUCTION HEATING AUGMENTATION FOR THERMAL CURING

(71) Applicant: The Boeing Company, Chicago, IL (US)

(72) Inventors: Marc Rollo Matsen, Seattle, WA (US); Robert James Miller, Fall City, WA (US); Brian W. Smith, Bellevue, WA (US); Geoffrey Allen Butler, Seattle, WA (US); Karl Marius Nelson, Issaquah, WA (US)

(*) Notice: Subject to any disclaimer, the term of this patent is extended or adjusted under 35 U.S.C. 154(b) by 342 days.

(21) Appl. No.: 13/770,235

(22) Filed: Feb. 19, 2013

(65) Prior Publication Data
US 2014/0231402 A1  Aug. 21, 2014

(51) Int. Cl.
| | |
|---|---|
| *H05B 11/00* | (2006.01) |
| *H05B 1/00* | (2006.01) |
| *B29C 35/02* | (2006.01) |
| *B29C 35/08* | (2006.01) |

(52) U.S. Cl.
CPC .............. *H05B 1/00* (2013.01); *B29C 35/0227* (2013.01); *B29C 35/0805* (2013.01); *B29C 2035/0811* (2013.01); *B29C 2035/0816* (2013.01)

(58) Field of Classification Search
CPC ............ B29C 35/0227; B29C 35/0805; B29C 35/0811; B29C 35/12; B29C 35/14; B29C 2035/08114; B29C 2035/0816; B29C 70/48; B29C 73/10; B29C 73/30; B29C 73/34; H05B 1/00; H05B 6/106; H05B 2206/023
See application file for complete search history.

(56) References Cited

U.S. PATENT DOCUMENTS

| | | | |
|---|---|---|---|
| 2,129,203 | A | 9/1938 | Dufour et al. |
| 5,412,185 | A | 5/1995 | Sturman, Jr. et al. |
| 8,330,086 | B2 | 12/2012 | Miller et al. |
| 2012/0065281 | A1 | 3/2012 | Takahashi |
| 2012/0145702 | A1 | 6/2012 | Miller et al. |
| 2012/0145703 | A1 | 6/2012 | Matsen et al. |

FOREIGN PATENT DOCUMENTS

| | | | |
|---|---|---|---|
| EP | 2100711 | * | 9/2009 |
| EP | 2100711 A1 | | 9/2009 |
| EP | 2508329 A1 | | 10/2012 |
| GB | 2477850 | * | 8/2011 |
| GB | 2477850 A | | 8/2011 |

OTHER PUBLICATIONS

International Search Report and Written Opinion, dated Apr. 24, 2014, regarding Application No. PCT/US2014/012017, 11 pages.
International Preliminary Report on Patentability, dated Aug. 25, 2015, regarding Application No. PCT/US2014/012017, 7 pages.

* cited by examiner

*Primary Examiner* — Shawntina Fuqua
(74) *Attorney, Agent, or Firm* — Yee & Associates, P.C.

(57) ABSTRACT

The thermal cycle time for curing a thermoset composite part in an autoclave is reduced by placing a heating blanket in proximity to an area of the composite part that is slow-to-heat, and inductively heating the area of the composite part that is slow-to-heat using the heating blanket.

15 Claims, 6 Drawing Sheets

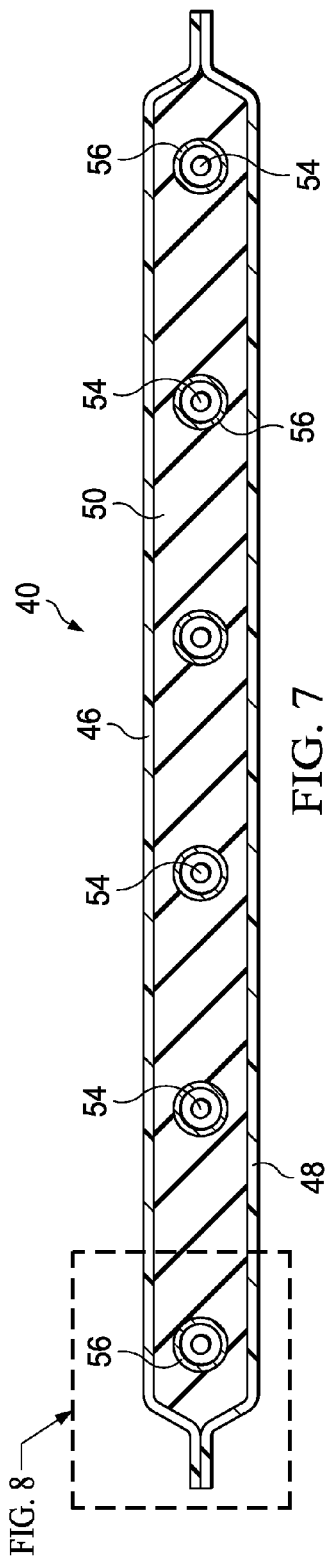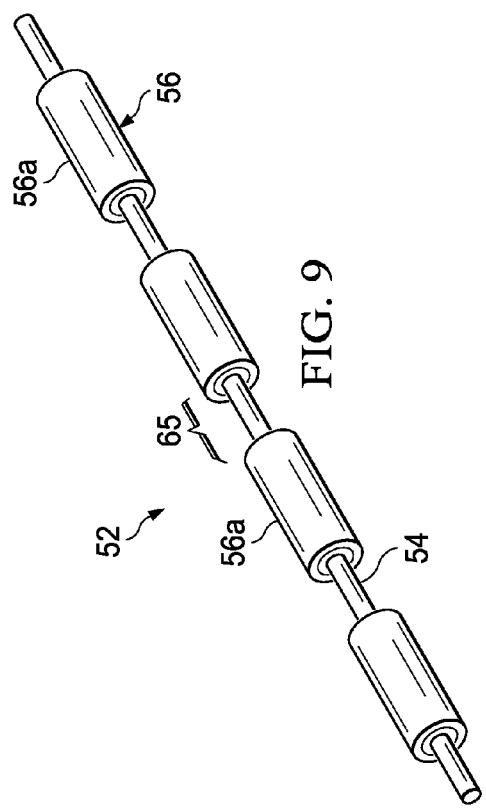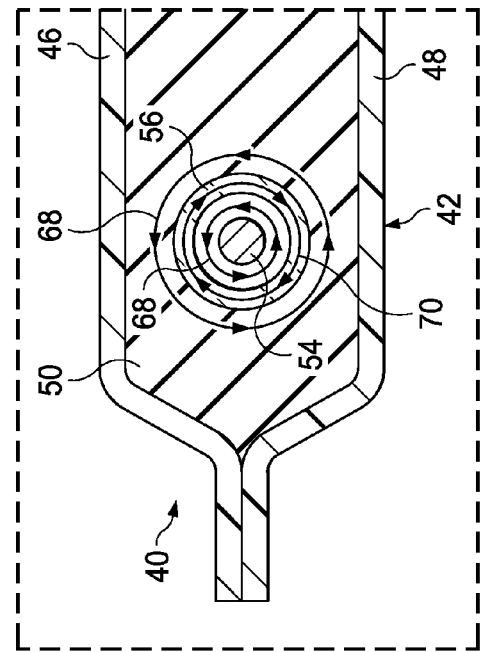

INDUCTION HEATING AUGMENTATION FOR THERMAL CURING

BACKGROUND INFORMATION

1. Field

The present disclosure generally relates to the fabrication of thermoset composite parts, and deals more particularly with techniques for thermal curing of the parts.

2. Background

Thermal curing of thermoset composite parts may be carried out in an oven or an autoclave where a heat source such as resistive heating elements, supplies heat to the part through a combination of conduction, convection and radiation. Full curing requires that all areas of the part being heated to the necessary cure temperature for a prescribed period of time. Where parts have areas of different masses or thermal insulation characteristics, typical of larger, more complex parts, extended cycle times may be required to carry out full curing because the part areas having a higher mass or thermal insulation characteristic are slower to heat up to the required cure temperature. These extended cure cycle times reduce production throughput and may result in the need for additional autoclaves or ovens to meet higher production schedules.

Accordingly, there is a need for a method and apparatus which reduces cure cycle times by providing a more efficient curing of the thermoset composite parts, especially those having areas of different mass or thermal insulation characteristics. There is also a need for a method and apparatus of the type mentioned above that may be used in combination with existing thermal curing equipment and which provides selective, precisely controlled thermal augmentation for carrying out enhanced, optimized curing of thermoset composite parts.

SUMMARY

The disclosed embodiments provide a method and apparatus for augmenting thermal curing equipment such as autoclaves and ovens, in order to reduce cure cycle times and achieve precisely controlled curing of the thermoset composite parts. Thermal augmentation is achieved by strategic placement of inductive heating blankets in areas of the parts or their associated tooling that are normally slow-to-heat because of their higher mass or thermal insulation characteristics. The heating blankets employ inductive heating to achieve even, precisely controlled heating of the slow-to-heat part areas. The inductive heating blanket is easily installed and provides flexibility in production environments to achieve heating augmentation of selected part areas, regardless of the size or complexity of the part, and variations in mass or thermal insulation characteristics from part-to-part. The augmented heating of slow-to-heat areas of the parts accelerates heating of these areas, thereby shortening the curing thermal cycle. Although the disclosed embodiments may be used in connection with reducing cure cycles for thermoset parts, they may also be employed to heat other types of composites, such as thermoplastic parts, to a desired temperature during production processes.

According to one disclosed embodiment, a method is provided of curing a thermoset resin part. The method comprises placing an assembly of a thermoset resin part and a cure tool inside an autoclave, and placing a heating blanket in proximity to an area of the assembly that is normally slow-to-heat during a thermal cure cycle. The method also comprises using the autoclave to heat the assembly, and using the heating blanket to heat the area of the assembly that is slow-to-heat. Placing the heating blanket is performed by placing the heating blanket against a portion of the assembly having a mass that is substantially greater than the mass of other portions of the assembly. Placing the heating blanket against a portion of the assembly is performed by placing the heating blanket against a surface of the tool. The method may further comprise placing the thermoset resin part on one side of the cure tool, and placing the heating blanket in proximity to the area of the assembly that is slow-to-heat includes placing the heating blanket on a side of the cure tool opposite the one side thereof. Using heating blanket to heat the area of the assembly that is slow-to-heat is performed by inductive heating. The inductive heating is performed by inductively heating a susceptor sleeve in response to a magnetic field, and reducing the inductive heating of the susceptor sleeve when the susceptor sleeve becomes non-magnetic upon reaching a Curie temperature of the susceptor sleeve. The method may also comprise applying alternating current to a conductor having the susceptor sleeve mounted thereto, the susceptor sleeve being formed of magnetic material having the Curie temperature. The method may further comprise selecting a susceptor sleeve having a Curie temperature that is substantially equal to the cure temperature of the composite resin part.

According to a further embodiment, a method is provided of reducing the thermal cycle time required for heating a composite part in a heating chamber. The method comprises placing a heating blanket in proximity to an area of the composite part that is slow-to-heat, and inductively heating the area of the composite part that is slow-to-heat using the heating blanket. Placing a heating blanket in proximity to an area of the composite part includes placing the heating blanket against a tool that contacts the composite part. Inductively heating the area of the composite part is performed by inductively heating a susceptor sleeve in response to a magnetic field, reducing the inductive heating of the susceptor sleeve when the susceptor sleeve becomes non-magnetic upon reaching a Curie temperature of the susceptor sleeve, applying alternating current to a conductor having the susceptor sleeve mounted thereto, the susceptor sleeve being formed of magnetic material having the Curie temperature, and generating a magnetic field along the length of the susceptor sleeve in response to the alternating current.

According to still another embodiment, a method is provided of thermally heating a composite part having areas of differing thermal mass or differing thermal insulation characteristics. The method comprises placing the composite part on a cure tool, and placing the cure tool and composite part in an autoclave. The method also comprises using the autoclave to apply external heat to the tool and to the composite part, and augmenting the heat supplied to an area of the composite part having high mass or thermal insulation characteristic by inductively heating the area. Augmenting the heat supplied to the area of the composite part includes placing an inductive heating blanket in proximity to the area. Placing the inductive heating blanket in proximity to the area includes placing the heating blanket against one of the tool, and surfaces of the composite part.

According to still another embodiment, apparatus is provided for thermally curing a thermoset part on a tool, comprising an autoclave adapted to have the combination of the tool and the thermoset part placed therein, the autoclave including a heating element adapted to provide heat to the combination of the tool and the thermoset part, and at least one heating blanket in the autoclave for generating heat in a local area of the combination of the tool and the thermoset part. The heating blanket is an induction heater located in an area of the combination of the tool and the part having a mass greater than other areas of the combination of the tool and the part. The heating blanket includes a conductor for receiving current and generating a magnetic field in response thereto, and a susceptor sleeve formed of magnetic material having a Curie temperature, the susceptor sleeve extending along the conductor for induction heating thereof in response to the magnetic field. The heating blanket also includes a matrix in thermal contact with the susceptor sleeve. The heating blanket may include a conductor for receiving electrical current and generating a magnetic field in response to the electrical current, and a plurality of sleeve segments mounted on the conductor and arranged in end to end a relationship to each other, each one of the sleeve segments being comprised of magnetic material having a Curie temperature, the sleeve segments being inductively heated in response to the magnetic field.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 7 is an illustration of a sectional view taken along the line 7-7 in FIG. 6.

FIG. 8 is an enlarged illustration of the area designated as "FIG. 8" in FIG. 7.

FIG. 9 is an illustration of a perspective view of the conductor provided with several segments of the susceptor.

DETAILED DESCRIPTION

Figure 1:
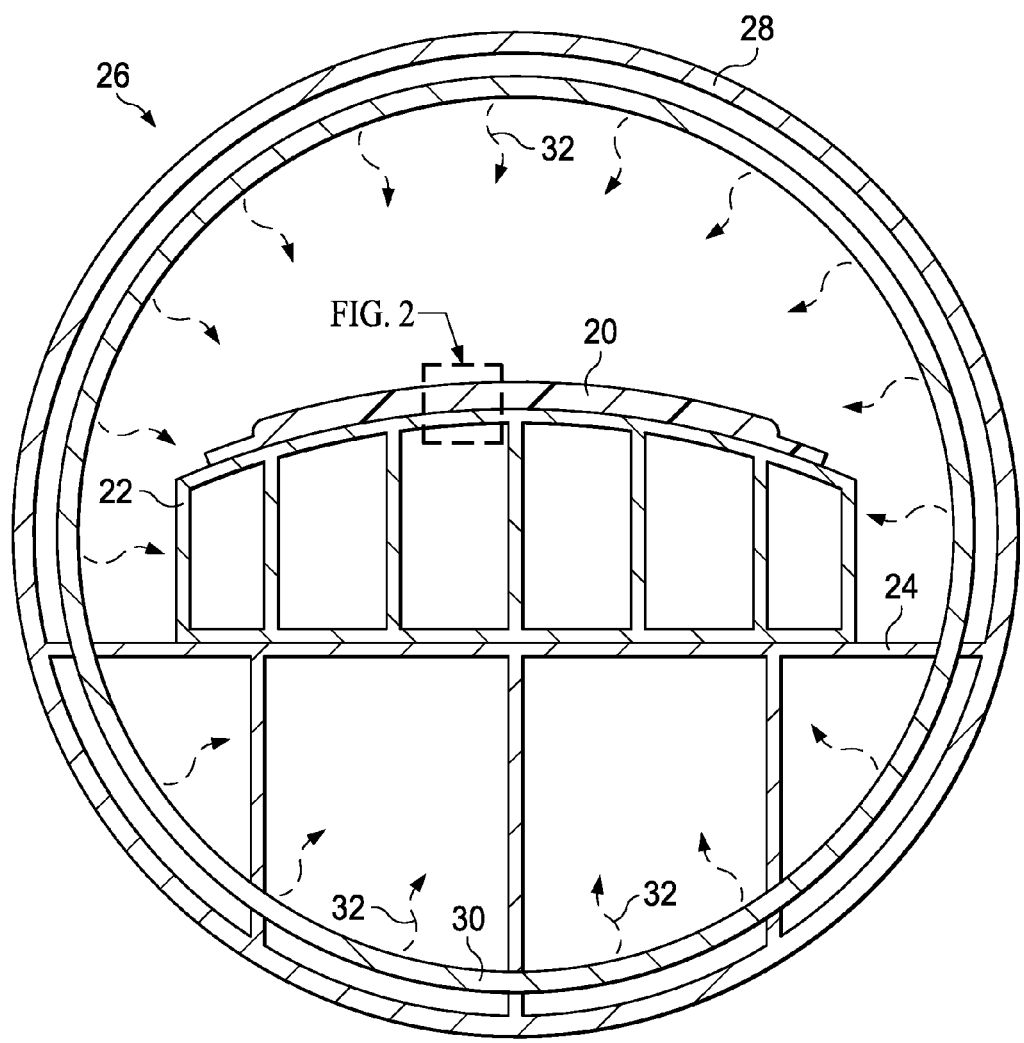
FIG. 1 is an illustration of a diagrammatic, cross-sectional view of a thermoset resin part being cured within an autoclave.
Figure 2:
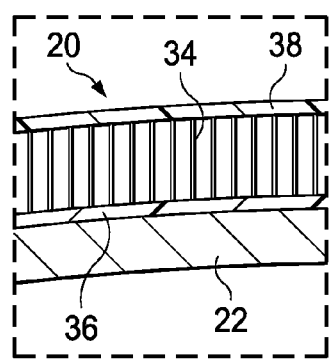
FIG. 2 is an illustration of a cross-sectional view of the area designated as "FIG. 2" in FIG. 1.

Referring first to FIGS. 1 and 2, an uncured, thermoset resin composite part 20 may be placed on a cure tool 22 for curing in an autoclave 26. The assembly of the composite part 20 and cure tool 20 are supported on a cure rack 24 inside a pressure vessel 28 forming part of the autoclave 26. As shown in FIG. 2, the composite part 20 may comprise, for example and without limitation, a sandwich panel comprising a honeycomb core 34 sandwiched between inner and outer facesheets 36, 38, respectively. Each of inner and outer facesheets 36, 38 may comprise multiple laminated plies (not shown) of a fiber reinforced thermosetting resin, such as carbon fiber epoxy. A wide range of other constructions and geometries are possible for the thermoset composite part 20.

The composite part 20 is cured by subjecting it to a combination of heat and pressure within the autoclave 26, according to a predetermined cure schedule specifying applied pressures, temperatures and durations for which the pressures and temperatures are maintained. Heating of the composite part 20 is effected within the autoclave 26 using suitable means such as a circumferentially extending electrical resistive heating element 30 which heats 32 the composite part 23 using a combination of conduction, convection and radiation.

Figure 3:
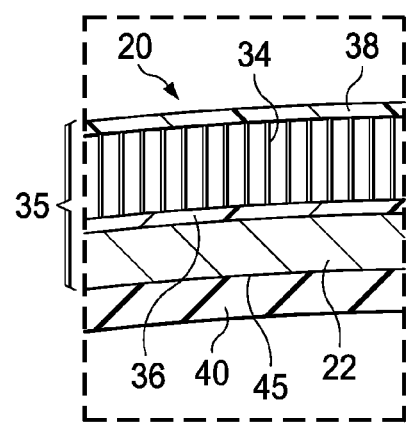
FIG. 3 is an illustration of a cross sectional view of the area designated as "FIG. 3" in FIG. 4.
Figure 4:
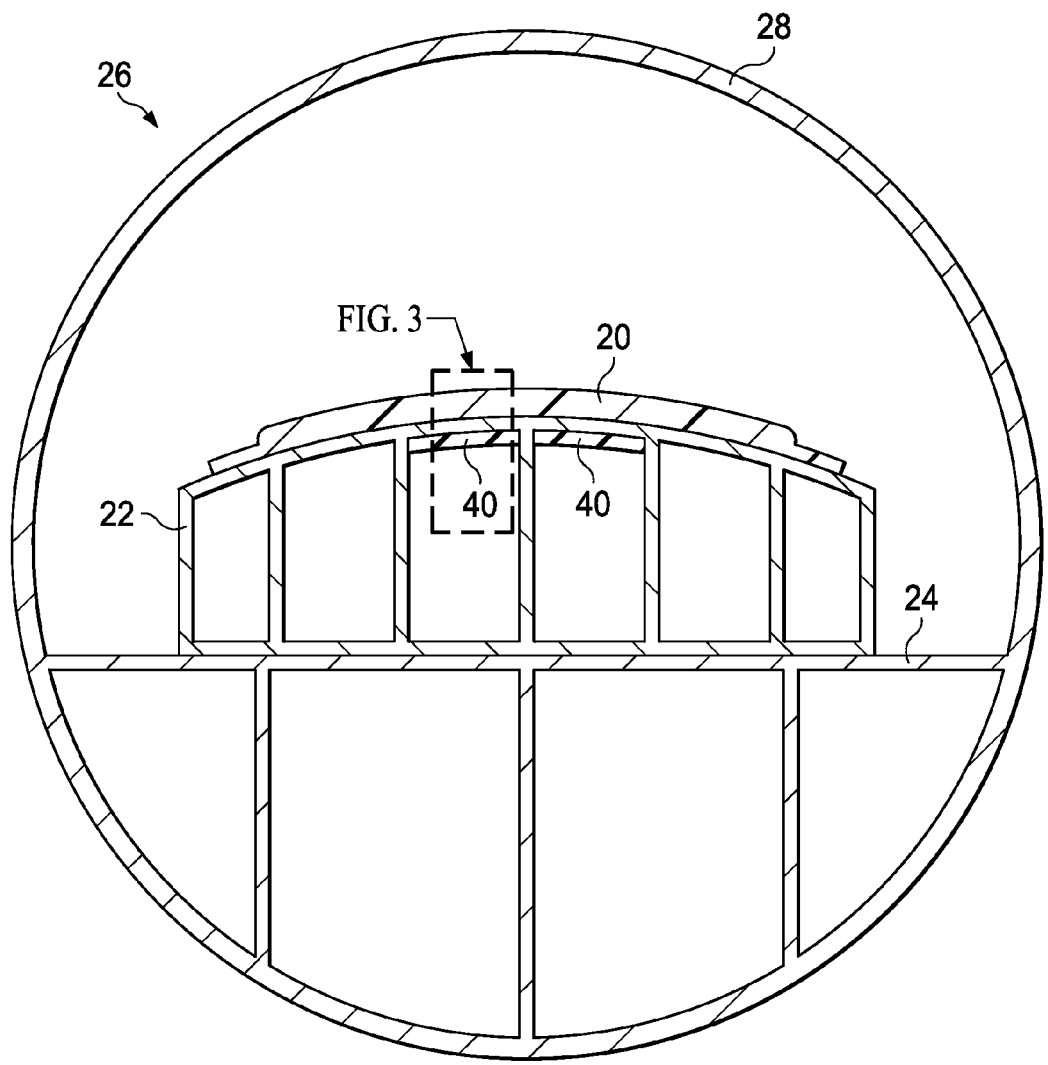
FIG. 4 is an illustration similar to FIG. 1 but showing the heating blanket of FIG. 4 placed along two sections of the tool.

Referring now also to FIGS. 3 and 4, the composite part 20 and the tool 22 may form an assembly 35 that includes local areas having a substantially higher mass and/or higher thermal insulation characteristics. These areas of higher mass and/or high thermal characteristics may take longer to heat to the necessary cure temperature using the heat 32 generated by the autoclave 26. These areas may be sometimes hereinafter referred to as areas of the composite part 20 that are "slow-to-heat". For example in the embodiment shown in FIGS. 1-4, outer facesheet 38 has a relatively low mass and is directly exposed to the heated environment within the autoclave 26, allowing it to heat relatively quickly to the required cure temperatures. In contrast, however, the inner facesheet 36 is insulated from the ambient autoclave environment by the honeycomb core 34, and the tool 22 which possesses a mass that is substantially greater than that of the composite part 20. Thus, the tool 22 as well as the inner facesheet 36 comprises an area of high mass that is slow-to-heat, normally requiring that longer cure cycle times be followed in order to assure that the tool 22, and thus the inner facesheet 36 have been heated to the necessary cure temperature.

In accordance with the disclosed embodiments, the rate at which the tool 22 and inner facesheet 36 are heated up to cure temperature may be increased using a heating blanket 40 to augment the heat generated by the heating element 36 of the autoclave 26. In the example shown in FIGS. 3 and 4, the heating blanket 40 may be placed directly against an exposed, outside face 45 of the tool 22. As will be discussed below in more detail, the heating blanket 40 generates heat through electrical induction, and the generated heat is transferred to the tool 22 primarily through conduction, although, depending upon the geometry of the tool 22 and placement of the heating blanket 40, the heat may also be transferred through convection and radiation. The heating blanket 40 may be formed of a flexible material that allows it to substantially conform to the geometry of the tool 22 or other structure having a relatively high mass and/or high thermal insulation characteristics which require heating augmentation in order to accelerate the cure cycle. In some applications, depending upon the geometry of the composite part 20 and/or the configuration of the tool 22, more than one heating blanket 40 may be used, particularly where larger areas that are slow-to-heat require heating augmentation. For example, FIG. 4 illustrates the use of a pair of the heating blankets 40 placed at different locations along the outer face 45 of the tool 22. It should also be noted here that while curing of a thermoset composite part 20 has been illustrated, the disclosed embodiments may be employed to reduce heating cycle times for processing of other types of composite parts that are processed in heating chambers such as ovens. For example, the disclosed method and apparatus for heating augmentation may be used in connection with forming and/or consolidating thermoplastic components and parts in a heating chamber such as an oven.

Figure 5:
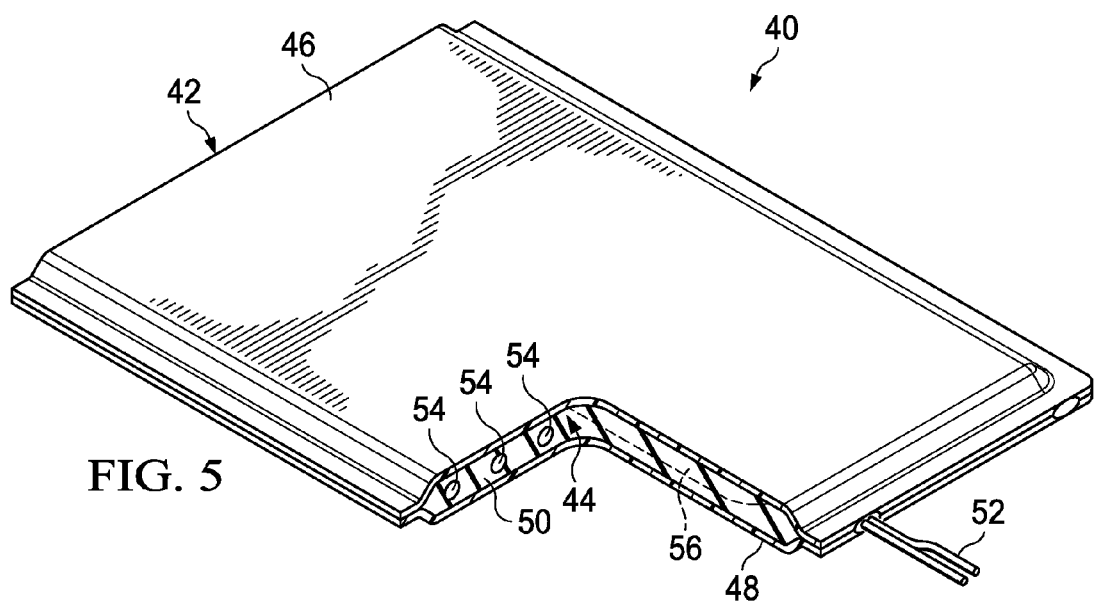
FIG. 5 is an illustration of a perspective view of the heating blanket, a portion of the housing broken away for clarity.
Figure 6:
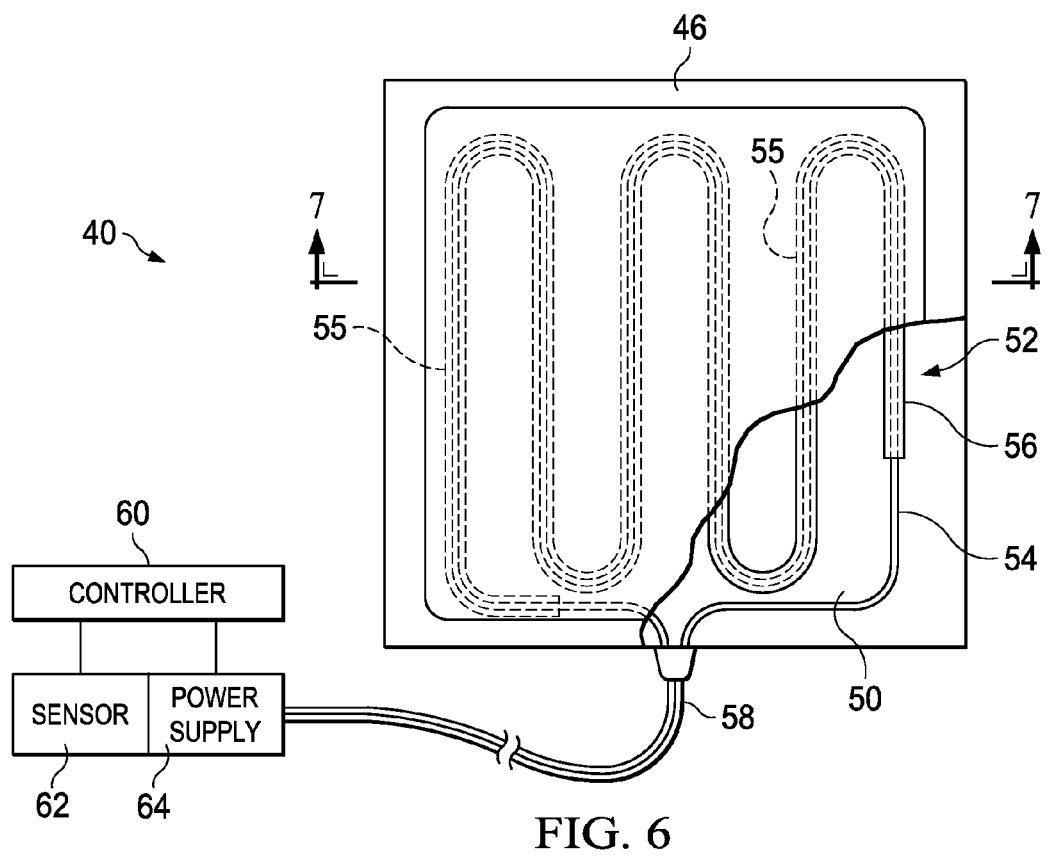
FIG. 6 is a schematic illustration of the heating blanket and associated power and control system, parts of the housing being broken away to reveal the conductor and susceptor.

The heating blanket 40 may employ any of various heating techniques to generate the heat necessary to accelerate heating of slow-to-the heat areas to cure temperatures. For example, the details of one suitable embodiment of the heating blanket 40 are illustrated in FIGS. 5, 6 and 7, wherein magnetic properties of magnetic materials are employed in combination with the application of high frequency alternating electrical power to generate heat. In this exemplary embodiment, the heating blanket 40 comprises upper and lower facesheets 46, 48 forming a housing 42 having an interior 44 that is filled with a thermally conductive matrix 50 (FIG. 7). The upper and lower facesheets 46, 48 are preferably formed of a flexible, resilient material possessing a relatively high thermal conductivity and a relatively low electrical conductivity. For example, the upper and lower facesheets 46, 48 may comprise silicone, rubber, polyurethane or other suitable elastomers that provide dimensional stability to the housing 42 while maintaining sufficient flexibility to allow the heating blanket 40 to conform to the surface of a tool 22, a part 20 or other structure, including surfaces that are irregular or contoured. In one embodiment, the matrix 50 comprises an elastomer that is cast around the inductive heating element 52. In still other embodiments, however, the heating blanket 40 may not be flexible and the housing 42 may be formed into a permanent, non-flexible shape that suits a particular application.

An inductive heating element 52 is embedded within the matrix 50. The inductive heating element 52 comprises an electrical conductor 54 and a surrounding susceptor sleeve 56 which are co-axially arranged. The conductor 54 may comprise, for example and without limitation, a Litz wire arranged in a coil over which a spiral type susceptor is sleeved. The susceptor sleeve 56 may extend substantially the entire length of the conductor 54. Axial spacing between the conductor 54 and the susceptor sleeve 56 electrically insulates the susceptor sleeve 56 from the conductor 54. In the disclosed embodiment, the inductive heating element 52 is arranged in a serpentine pattern with generally parallel legs 55, however other patterns and layout arrangements are possible. While only a single inductive heating element 52 is shown in the exemplary embodiment, other embodiments may include multiple inductive heating elements 52. The susceptor sleeve 56 is inductively heated by alternating electrical current flow through the conductor 54. The inductively heated susceptor sleeve 56 conducts heat to the matrix 50, which in turn conducts heat through the housing 42 to the structure, such as the tool 22 (FIGS. 3 and 4), against which the heating blanket 40 is in contact.

The matrix 50 may include ferromagnetic or superparamagnetic particles (not shown) to aid in heating the matrix 50. Where ferromagnetic particles are employed, the matrix 50 is heated by hysteretic heating of the ferromagnetic particles to a temperature that is substantially below the Curie temperature of the particles. Where superparamagnetic particles are incorporated into the matrix 50, the heat that is conducted through the matrix 50 is generated by relaxation heating of the superparamagnetic particles in correspondence to a Curie temperature range related to the size or diameter of the superparamagnetic particles.

Referring particularly to FIG. 6, suitable wiring 58 connects the heating element 52 to an alternating current power supply 64 that may be either a portable or fixed power supply. The power supply 64 is connected to a power source, such as for example and without limitation, a conventional 60 Hz, 110 volt or 220 volt outlet (not shown). The power supply 64 supplies alternating current to the conductor 54, preferably in the range from approximately 1,000 Hz to approximately 300,000 Hz, although higher frequencies are possible. One or more thermal sensors 62 may be located between the heating blanket 40 and the structure against which it has been placed for monitoring the temperature of the structure in order to facilitate regulation of the magnitude or frequency of the alternating current supplied to the conductor 54. The power supply 64 can be regulated by a suitable controller 60 based on the temperatures monitored by the thermal sensors 62.

As shown in FIGS. 7 and 8, the susceptor sleeve 56 is formed of a magnetic material having a Curie temperature. The susceptor sleeve 56 may be formed as a solid or unitary component in a cylindrical arrangement, preferably from a braided material in a sleeve configuration around the conductor 54 in order to enhance flexibility of the heating blanket 40.

Referring now particularly to FIG. 8, the flow of alternating current through the conductor 54 results in the generation of a magnetic field 68 surrounding the susceptor sleeve 56. Eddy currents 70 are generated within the conductor 54 as a result of exposure thereof to the magnetic field 68, and these eddy currents 70 cause the inductive heating of the susceptor sleeve 56. Heat from the susceptor sleeve 56 is then conducted through the matrix material 50, and the housing 42 to the tool 22 (FIGS. 3 and 4), part 20 or other structure. The magnetic material from which the susceptor sleeve 56 is formed preferably has a high magnetic permeability and a Curie temperature that corresponds to the desired temperature to which the tool 22 is to be heated by the heating blanket 40. i.e. the cure temperature of the thermoset resin part 20. The susceptor sleeve 56 and the conductor 54 are preferably sized and configured such that at temperatures below the Curie temperature of the susceptor sleeve 56, the magnetic field 68 is concentrated in the susceptor sleeve 56 due to its magnetic permeability.

Heating of the susceptor sleeve 56 continues during application of the alternating current until the magnetic material from which the susceptor sleeve 56 is formed of reaches the Curie temperature. Upon reaching the Curie temperature, the susceptor sleeve 56 becomes non-magnetic, at which point the magnetic fields 68 are no longer concentrated in the susceptor sleeve 56. The induced eddy currents 70 and associated resistive heating diminishes to a level sufficient to maintain the temperature of the susceptor sleeve 56 at the Curie temperature, consequently the tool 22 or other slow-to-heat area of the structure remains heated to the desired cure temperature for the duration of the cure cycle, at which point the alternating current is removed from the conductor 54.

FIG. 9 illustrates an alternate embodiment of the heating element 52. In this embodiment, the susceptor sleeve 56 comprises a plurality of longitudinally spaced apart susceptor sleeve segments 56a. Gaps 65 between the susceptor sleeve segments 56a allow the magnetic field 68 generated by the conductor 54 to reach the outer surface of each sleeve segment 56a, providing increased alternating electrical current to generate heat and increase the overall efficiency of the heating blanket 40. Segmenting the susceptor sleeve 56 also allows the heating blanket 40 to more readily conform to irregular surfaces of a structure against which the heating blanket 40 has been placed. In still other embodiments, the susceptor sleeve 56 may comprise a spirally wrapped wire (not shown) coaxially arranged around, and insulated from the conductor 54.

It should be noted here that FIGS. 5-9 illustrate only one of several possible constructions of a heating blanket 40 suitable for carrying out the disclosed method by providing the desired heating augmentation. Other constructions are possible. For example, and without limitation, the susceptor sleeve 56 may comprise a spring shaped coil that is sleeved over a Litz wire (conductor 54). Alternatively, the heating blanket 40 may comprise a woven design wherein one direction of the weave comprises the Litz wire 54, and the other direction of the weave comprises a smart susceptor wire. Moreover, in other embodiments, the smart susceptors 56 may be encased in a flattened solenoidal coil (not shown) formed of a Litz wire.

Figure 10:
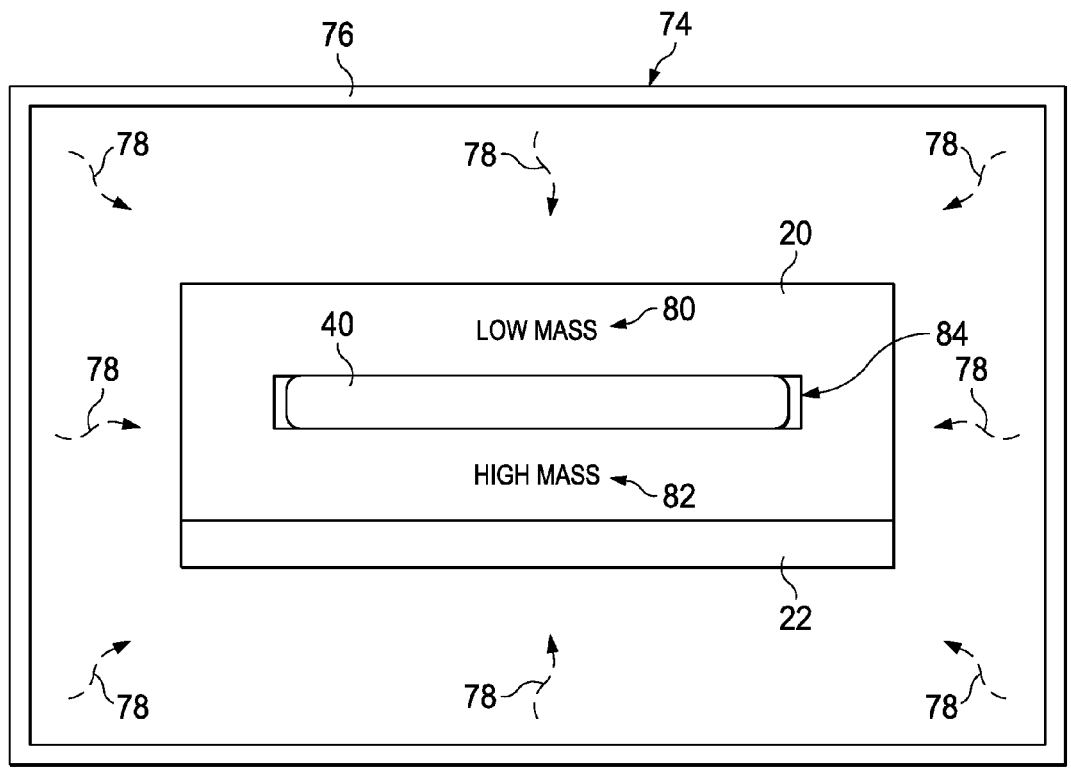
FIG. 10 is an illustration of a diagrammatic cross sectional view showing a heating blanket placed directly against a part being thermally cured within an oven.

Attention is now directed to FIG. 10 which illustrates a thermoset composite part 20 being thermally cured inside an oven 74. One or more heating elements 76 forming part of the oven 74 provide heat 78 to the part 20 through a combination of conduction, convection and radiation. The part 20 may include one or more cavities 84 that act to insulate some portions of the part 20, and/or areas of low and high mass 80, 82 respectively. In this example, rather than placing the heating blanket 40 against the tool 22, the heating blanket 40 may be placed in the cavity 84, preferably in contact with surfaces of the part 20, to accelerate curing of the area of high mass 82 which, in combination with the tool 22, is normally slow-to-heat during the cure cycle.

Figure 11:
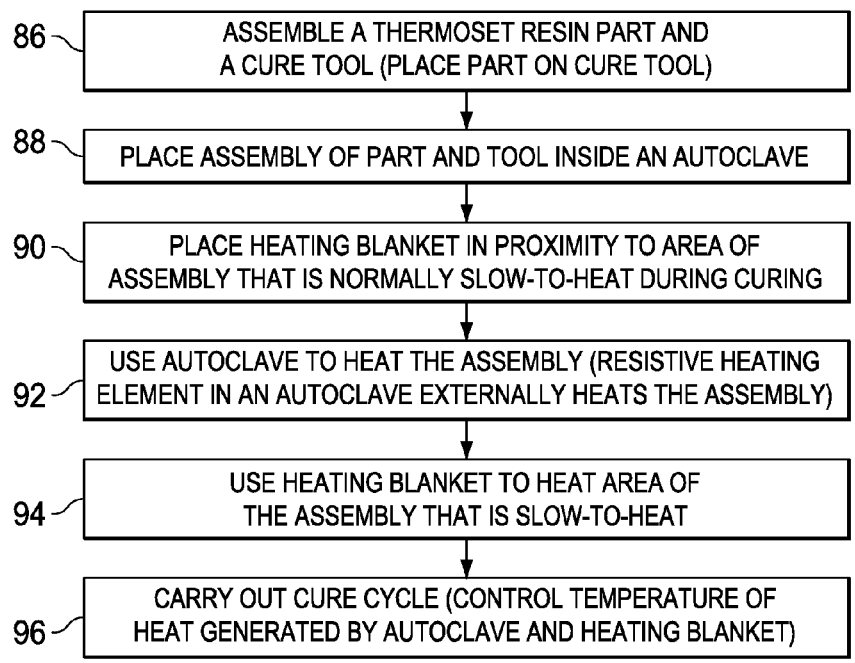
FIG. 11 is an illustration of a flow diagram of a method of curing a thermoset composite part that may reduce cure cycle times according to the disclosed embodiments.

FIG. 11 illustrates the overall steps of a method of curing a thermoset resin composite part 20 using the disclosed heating blanket 40 to provide augmented heating of certain areas of the part 20. Beginning at 86, the thermoset resin part 20 and a cure tool 22 are assembled, which typically may consist of putting an uncured composite resin part on a cure tool. At 88, the assembly 35 of the composite part and the tool is placed inside an autoclave 26 or an oven 74 for thermal curing. At 90, one or more of the heating blankets 40 is placed in proximity to an area of the assembly that is normally slow-to-heat during a cure cycle. At step 92, the autoclave (or oven) is used to heat the assembly 35, typically using a resistive heating element that externally heats the assembly 35. At step 94, the heating blanket 40 is used to heat an area of the assembly 35 that is slow to heat. At 96, a thermal cure cycle is carried out by controlling the temperature of the heat generated by the autoclave 26 or oven 74, as well as the heat generated by the heating blanket 40.

Figure 12:
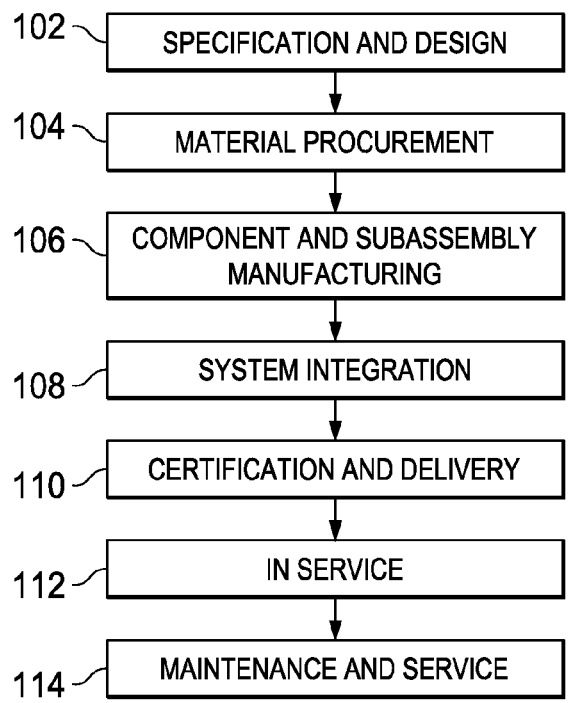
FIG. 12 is an illustration of a flow diagram of aircraft production and service methodology.
Figure 13:
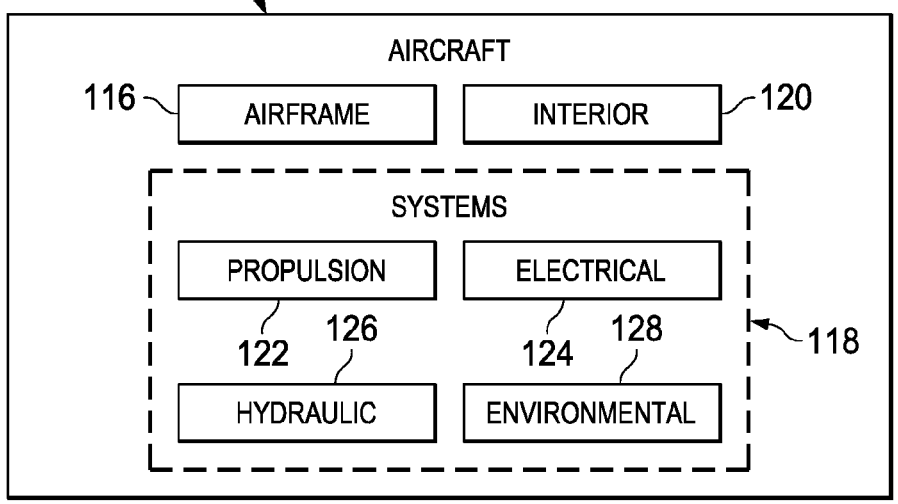
FIG. 13 is an illustration of a block diagram of an aircraft.

Embodiments of the disclosure may find use in a variety of potential applications, particularly in the transportation industry, including for example, aerospace, marine, automotive applications and other application where thermal curing of thermoset composite parts is carried out. Thus, referring now to FIGS. 12 and 13, embodiments of the disclosure may be used in the context of an aircraft manufacturing and service method 98 as shown in FIG. 12 and an aircraft 100 as shown in FIG. 13. During pre-production, exemplary method 98 may include specification and design 102 of the aircraft 100 and material procurement 104. During production, component and subassembly manufacturing 106 and system integration 108 of the aircraft 100 takes place. Thereafter, the aircraft 100 may go through certification and delivery 110 in order to be placed in service 112. While in service by a customer, the aircraft 100 is scheduled for routine maintenance and service 114, which may also include modification, reconfiguration, refurbishment, and so on.

Each of the processes of method 98 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 100 produced by exemplary method 98 may include an airframe 116 with a plurality of systems 118 and an interior 120. Examples of high-level systems 118 include one or more of a propulsion system 122, an electrical system 124, a hydraulic system 126, and an environmental system 128. Any number of other systems may be included. Although an aerospace example is shown, the principles of the disclosure may be applied to other industries, such as the marine and automotive industries.

Systems and methods embodied herein may be employed during any one or more of the stages of the production and service method 98. For example, components or subassemblies corresponding to production process 106 may be fabricated or manufactured in a manner similar to components or subassemblies produced while the aircraft 100 is in service. Also, one or more apparatus embodiments, method embodiments, or a combination thereof may be utilized during the production stages 1068 and the 108, for example, by substantially expediting assembly of or reducing the cost of an aircraft 100. Similarly, one or more of apparatus embodiments, method embodiments, or a combination thereof may be utilized while the aircraft 100 is in service, for example and without limitation, to maintenance and service 114.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of curing a thermoset resin part, comprising:
    placing an assembly of a thermoset resin part and a cure tool inside an autoclave;
    placing a heating blanket in proximity to an area of the assembly that is normally slow-to-heat during a thermal cure cycle;
    using the autoclave to heat the assembly; and,
    using heating blanket to heat the area of the assembly that is slow-to-heat by inductive heating.

2. The method of claim 1, wherein placing the heating blanket is performed by placing the heating blanket against a portion of the assembly having a mass is substantially greater than the mass of other portions of the assembly.

3. The method of claim 2, wherein placing the heating blanket against a portion of the assembly is performed by placing the heating blanket against a surface of the tool.

4. The method of claim 1, further comprising:
    placing the thermoset resin part on one side of the cure tool, and,
    placing the heating blanket in proximity to the area of the assembly that is slow-to-heat includes placing the heating blanket on a side of the cure tool opposite the one side thereof.

5. The method of claim 1, wherein the inductive heating is performed by:
   inductively heating a susceptor sleeve in response to a magnetic field, and,
   reducing the inductive heating of the susceptor sleeve when the susceptor sleeve becomes non-magnetic upon reaching a Curie temperature of the susceptor sleeve.

6. The method of claim 5, further comprising the step of:
   applying alternating current to a conductor having the susceptor sleeve mounted thereto, the susceptor sleeve being formed of magnetic material having the Curie temperature.

7. The method of claim 5, further comprising:
   selecting a susceptor sleeve having a Curie temperature that is substantially equal to the cure temperature of the thermoset resin part.

8. A method of reducing the thermal cycle time required for heating a composite part in heating chamber, comprising:
   placing a heating blanket in proximity to an area of the composite part that is slow-to-heat; and
   inductively heating the area of the composite part that is slow-to-heat using the heating blanket by:
      inductively heating a susceptor sleeve in response to a magnetic field,
      reducing the inductive heating of the susceptor sleeve when the susceptor sleeve becomes non-magnetic upon reaching a Curie temperature of the susceptor sleeve,
      applying alternating current to a conductor having the susceptor sleeve mounted thereto, the susceptor sleeve being formed of magnetic material having the Curie temperature, and
      generating a magnetic field along the length of the susceptor sleeve in response to the alternating current.

9. The method of claim 8, wherein placing a heating blanket in proximity to an area of the composite part includes placing the heating blanket against a tool that contacts the composite part.

10. A method of heating a composite part having areas of differing thermal mass or differing thermal insulation characteristics, comprising:
    placing the composite part on a cure tool;
    placing the cure tool and composite part in an autoclave;
    using the autoclave to apply external heat to the tool and the composite part; and,
    augmenting the heat supplied to an area of the composite part having high mass or thermal insulation characteristic by inductively heating the area.

11. The method of claim 10, wherein augmenting the heat supplied to the area of the composite part includes placing an inductive heating blanket in proximity to the area.

12. The method of claim 10, wherein placing the inductive heating blanket in proximity to the area includes placing the heating blanket against one of the tool and surfaces of the composite part.

13. An apparatus for thermally curing a thermoset part on a tool, comprising:
    an autoclave adapted to have the combination of the tool and the thermoset part placed therein, the autoclave including a heating element adapted to provide heat to the combination of the tool and the thermoset part; and,
    at least one heating blanket in the autoclave for generating heat in a local area of the combination of the tool and the thermoset part wherein the heating blanket is an induction heater.

14. The apparatus of claim 13, wherein the heating blanket is located in an area of the combination of the tool and the part having a mass greater than other areas of the combination of the tool and the part.

15. The apparatus of claim 13, wherein:
    the heating blanket includes a matrix in thermal contact with a susceptor sleeve.

\* \* \* \* \*